United States Patent [19]

Ezuka et al.

[11] Patent Number: 4,785,347
[45] Date of Patent: Nov. 15, 1988

[54] METHOD FOR EMPHASIZING SHARPNESS OF A PICTURE IMAGE BY FORMING AND PROCESSING SHARP AND UNSHARP SIGNALS FROM A PICTURE IMAGE SIGNAL

[75] Inventors: Daigo Ezuka; Osamu Shimazaki, both of Kaisei, Japan

[73] Assignee: Fuji Photo Film Co., Ltd., Kanagawa, Japan

[21] Appl. No.: 802,343

[22] Filed: Nov. 25, 1985

Related U.S. Application Data

[63] Continuation-in-part of Ser. No. 622,063, Jun. 18, 1984, abandoned.

[30] Foreign Application Priority Data

Jun. 20, 1983 [JP] Japan ................................ 58-110646

[51] Int. Cl.$^4$ ........................ H04N 1/46; H04N 1/40
[52] U.S. Cl. ........................................ 358/75; 358/284
[58] Field of Search ................. 358/75, 75 IS, 76, 78, 358/79, 80, 280, 284; 382/54; 364/515

[56] References Cited

U.S. PATENT DOCUMENTS

| | | | |
|---|---|---|---|
| 4,005,475 | 1/1977 | Knop | 358/80 |
| 4,054,916 | 10/1977 | Knop | 358/284 |
| 4,237,481 | 12/1980 | Aughton | 358/80 |
| 4,315,318 | 2/1982 | Kato et al. | 358/284 |
| 4,317,179 | 2/1982 | Kato et al. | 358/284 |
| 4,334,244 | 6/1982 | Chan et al. | 358/166 |
| 4,346,409 | 8/1982 | Ishida et al. | 358/284 |
| 4,402,007 | 8/1983 | Yamada | 358/75 |
| 4,536,803 | 8/1985 | Hennig | 358/284 |
| 4,571,635 | 2/1986 | Mahmoodi et al. | 358/284 |
| 4,591,923 | 5/1986 | Vrabe et al. | 358/284 |
| 4,700,399 | 10/1987 | Yoshida | 358/79 |

FOREIGN PATENT DOCUMENTS 198969 11/1983 Japan ..................................... 358/80

Primary Examiner—James J. Groody
Assistant Examiner—Randall S. Svihla
Attorney, Agent, or Firm—Wenderoth, Lind & Ponack

[57] ABSTRACT

A method for enhancing the sharpness of a color image includes the steps of generating three color separation signals and selecting one of the color separation signals to be a sharp signal; generating an unsharp signal from a color image and then multiplying the difference between the sharp signal and the unsharp signal by three multiplier coefficients to form three sharpness-enhancement signals. The resultant signals are added to the corresponding color separation signals to form sharpness enhanced color separation signals representing a sharpness enhanced color image.

2 Claims, 4 Drawing Sheets

FIG. IA PRIOR ART $D_0 = D_1$
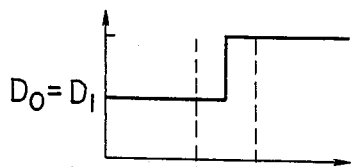
FIG. IB PRIOR ART $U_0$
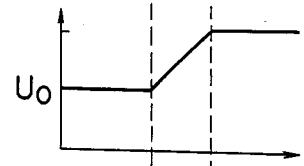
FIG. IC PRIOR ART $D_2, D_3$
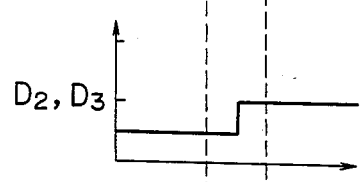
FIG. ID PRIOR ART $S_0 - U_0$
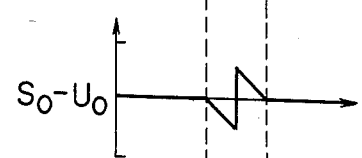
FIG. IE PRIOR ART $D'_1$
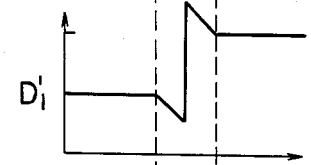
FIG. IF PRIOR ART $D'_2, D'_3$
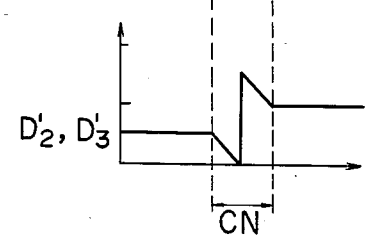
CN

METHOD FOR EMPHASIZING SHARPNESS OF A PICTURE IMAGE BY FORMING AND PROCESSING SHARP AND UNSHARP SIGNALS FROM A PICTURE IMAGE SIGNAL

CROSS-REFERENCE TO RELATED APPLICATION

This application is a continuation in part of our prior application Ser. No. 622083, filed on June 18, 1984, entitled "METHOD FOR ENHANCING SHARPNESS PICTURE IMAGES", and now abandoned.

BACKGROUND OF THE INVENTION

This invention relates to a method for enhancing the sharpness of picture images used for color scanners for plate making, laser color printers, facsimile devices and so on.

In order to enhance the sharpness in picture images, it is a general practice to form a sharpness enhancing signal by multiplying the difference between a sharp signal and an unsharp signal obtained from the picture images with a constant which determines the degree of enhancement, and to add the sharpness enhancing signal to a picture image signal. When the picture images are in color, a picture image is separated through a three-color filter and three-color image signals thus obtained are processed by the sharpness enhancement respectively. If it is assumed that the input three-color picture image is expressed as Di (i=1, 2, 3), and a sharp signal is expressed as Si (i=1, 2, 3), and an unsharp signal is expressed as Ui (i=1, 2, 3), and the picture image signal expressed as Di' (i=1, 2, 3), then the sharpness enhancement process will be expressed as follows:

$$Di' = Di + Ki \cdot (Si - Ui) \quad (1)$$

wherein Ki denotes a constant parameter determining the degree of sharpness enhancement.

In the above mentioned method of the formula (1), however, it is necessary to form a sharpness enhancement signal $Ki \cdot (Si - Ui)$ for each of the three colors, thereby complicating a processing device. There has been proposed a method of representing the sharpness enhancement signal $Ki \cdot (Si - Ui)$ by any one of the above three colors in order to simplify the process expressed by the above formula (1). In the method, if the sharpness enhancement signal corresponding to the selected color is represented by $Ki \cdot (S_0 - U_0)$, then the picture image signal Di' after processing will become:

$$Di' = Di + Ki \cdot (S_0 - U_0) \quad (2)$$

However, such a simplifying method is detrimental as it causes trouble unless the constant parameter used to determine the degree of sharpness enhancement is suitably set. Examples will be shown below to facilitate understanding.

Let us think of a case where the picture image signals $(D_1, D_2, D_3)$ of three-colors have the waveforms shown in FIGS. 1A and 1C. If a picture image signal $D_1$ is used as a sharp signal $S_0$, the unsharp signal $U_0$ will have the waveform shown in FIG. 1B, and the difference between the sharp signal $S_0$ and the unsharp signal $U_0$ will be as shown in FIG. 1D. If a constant parameter used to determine the degree of sharpness enhancement is set as a constant Ki for all of the colors, the waveforms after processing will be as shown in FIGS. 1E and 1F. This means that the picture image signals $D_2$ and $D_3$ are enhanced in sharpness excessively so as to make the intensity ratio of three-color picture image signals $(D_1', D_2', D_3')$ different from that of original picture image signals $(D_1, D_2, D_3)$ on the edges of the picture image (the portion CN in FIGS. 1A to 1F), the edges being the transitions between different intensities of the picture image. The intensity ratio among three-color picture image signals generally determines the hue of picture images and therefore, if such a ratio changes, the hue will inevitably change. Due to such changes, the color on the periphery of the picture image will change or become dull.

In order to avoid such inconveniences, it is necessary to set the constant parameter Ki for the colors other than $D_1$ at a smaller value than that used for $D_1$. On the other hand, the constant parameter Ki for the colors other than $D_1$ should be larger than that used for $D_1$ in order to avoid a color change or dull color on the periphery of the picture image (the region CN in FIGS. 2A to 2F) when the waveforms of three-color picture image signals $(D_1, D_2, D_3)$ are as shown in FIGS. 2A and 2C. In order to prevent color changes or dullness in the conventional simplified method for the sharpness enhancement, the constant parameter Ki should be set in accordance with the intensity ratio of the three-color picture image signals. Moreover, as the intensity ratio of a picture image signal changes depending on the position of the image, the constant parameter Ki should be varied in dependance upon the position.

SUMMARY OF THE INVENTION

An object of this invention is to provide a simple method which can enhance the sharpness of picture images without causing a color change or dullness on the edges of the picture images.

Another object of this invention is to provide a simple method which can enhance the sharpness of picture images without causing color changes on the edges of the picture images by varying the constant parameter to be used in the sharpness enhancement process in accordance with the intensity ratio of the three primary color picture image signals if they are in color.

Therefore, according to the present invention, there is provided a method for enhancing the sharpness of picture image comprising the steps of forming a sharp signal and an unsharp signal out of a picture image signal, and multiplying the difference between the sharp signal and the unsharp signal by a coefficient used for related to the degree of sharpness enhancement to form a sharpness enhancement signal, and adding the enhancement signal to the picture image signal, characterized in that the coefficient is a function of the picture image signal.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A through 1F and FIGS. 2A through 2F are the waveforms used for explaining the prior art sharpness enhancement method, respectively;

DETAILED DESCRIPTION OF THE INVENTION

The above mentioned objects of this invention are effectively achieved by changing the degree of sharpness enhancement of each color in accordance with the function of an input picture image signal or, in other words, in accordance with the intensity ratio among the three-color picture image signals if they are in color. In sum, according to this invention, a sharp signal and an unsharp signal are formed out of a picture image signal, a sharpness enhancement signal is obtained by multiplying the difference between the sharpness and unsharpness signals by a coefficient which determines the degree of sharpness enhancement, and such a signal is added to the picture image signal for the sharpness enhancement process. In the method, the coefficient is a function of the picture image signal so that the degree of sharpness enhancement can be set in accordance with the intensity of picture image signals.

The method according to this invention can be expressed by the formula below.

$$D_i' = D_i + k(D_i, D_0) \cdot (S_0 - U_0) \quad (3)$$

where $D_i'$ denotes a picture image signal after sharpness enhancement, $D_i$ denotes a color separation signal, $D_0$ denotes a picture image signal used for forming a sharp signal $S_0$ and a unsharp signal $U_0$.

Figure 2A:
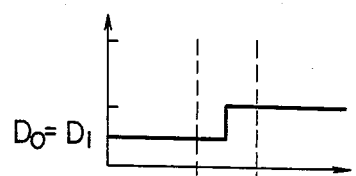
Figure 2B:
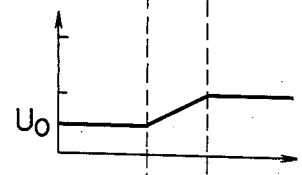
Figure 2C:
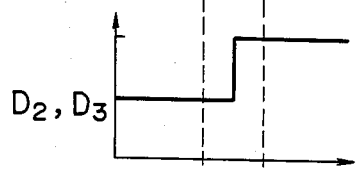
Figure 2D:
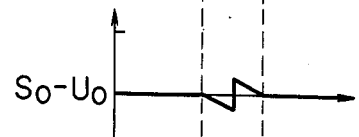
Figure 2E:
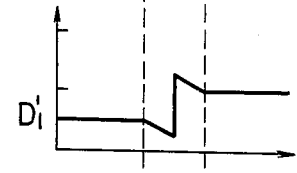
Figure 2F:
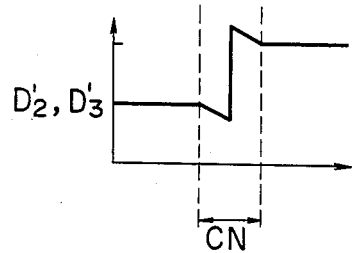
Figure 3:
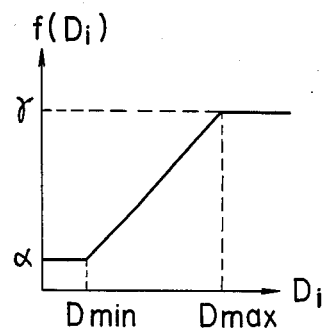
FIGS. 3 and 4 are graphs showing an example of functions to be used for this invention.
Figure 4:
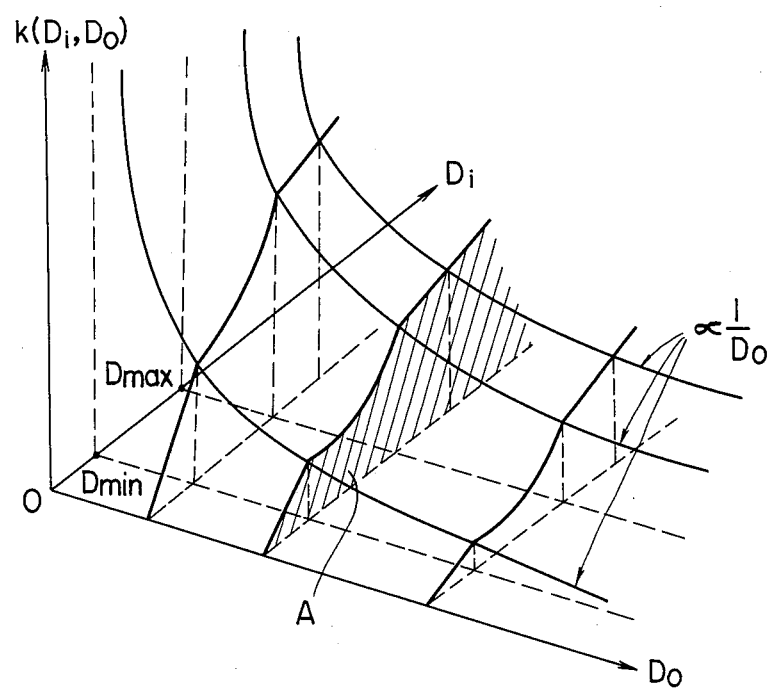
Figure 5A:
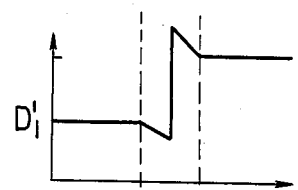
FIGS. 5A and 5B and FIGS. 6A and 6B are the waveforms used for explaining the sharpness enhancement method according to this invention, respectively.
Figure 5B:
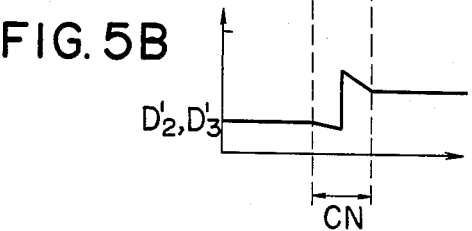
Figure 6A:
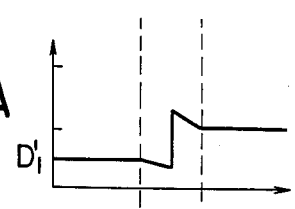
Figure 6B:
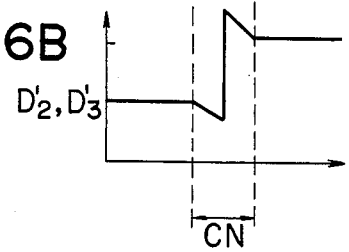

Now supposing that the coefficient ($k(D_i, D_0)$ were, for example, given as $$k(D_i, D_0) = f(D_i) \cdot \frac{D_i}{D_0} \quad (4)$$

and $f(D_i)$ were prescribed as a function represented by a graph shown in FIG. 3, the coefficient $k(D_i, D_0)$ would be represented by a graph such as shown in FIG. 4. In FIG. 3, the function $f(D_i)$ is expressed as follows.

$$\begin{aligned} f(D_i) &= \alpha & (0 < D_i \leq D_{min}) \\ f(D_i) &= \beta(D_i - D_{min}) + \alpha & (D_{min} \leq D_i \leq D_{max}) \\ f(D_i) &= \gamma & (D_{max} \leq D_i) \end{aligned} \quad (5)$$

where $\beta(D_{max} - D_{min}) + \alpha = \gamma$.

In FIG. 4, for example, a section A shows a form in the case that the picture image signal $D_0$ is constant in the above equation (4). A curve portion of the section described above is expressed by a quadratic function.

In case a sharpness intensification process is carried out on the basis of the equation (3) wherein the coefficient $k(D_i, D_0)$ thus given is utilized, it will be able to perform the sharpness intensification in response to the level of the image signal. FIGS. 5A and 5B and FIGS. 6A and 6B are graphs representing the results obtained by carrying out the sharpness intensification of the picture signals $D_1$, $D_2$ and $D_3$ shown in FIGS. 1A and 1C and FIGS. 2A and 2C in accordance with the equation (3) utilizing the coefficient $k(D_i, D_0)$ described above, respectively. According to these figures, it will be found that the sharpness intensification can be carried out with the level in response to the picture intensity, and simultaneously, the sharpness intensification can be also done in response to the intensification picture signal on the basis of the function $f(D_i)$ and it will also prevent an unimproved graininess from increasing due to the picture sharpness intensification treatment. In addition, since the differences in the intensification ratios of the picture signal between the three primary colors are considered on the basis of the term $D_i/D_0$ in the equation (4), the occurrences of the color turbidity and color change can be avoided at the peripheral portion of the picture image and the complicated portion of the picture ratios, even if the ratios of the primary three colors were each different.

Figure 7:
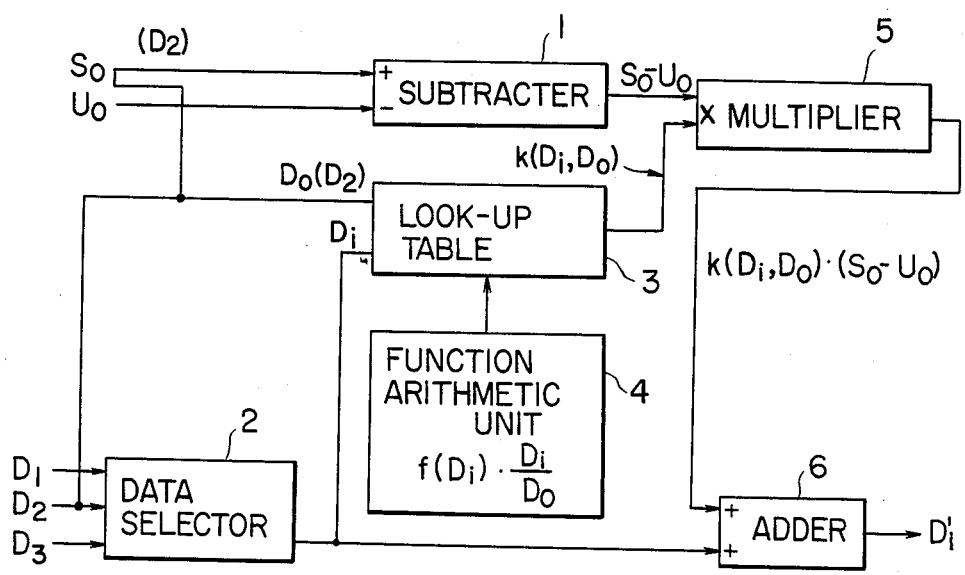
FIG. 7 is a block diagram showing an embodiment of the device to which the method according to this invention is applied.

One embodiment of a system for performing the sharpness intensification treatment according to this invention will be described hereunder in conjunction with FIG. 7.

A sharp signal $S_0$ and an unsharp signal $U_0$ obtained with respect to one color of the picture signal subjected to color analysis into three primary colors are inputted into a subtracter 1 so as to thereby obtain the difference $(S_0 - U_0)$. The sharp signal $S_0$ and unsharp signal $U_0$ are formed by the known method (such as that disclosed in U.S. Pat. Nos. 4,005,475 and 4,054,916). A data selector 2 selectively separates the picture signal $D_i$ representing the color to be subjected to the sharpness intensification treatment from the signals $D_1$, $D_2$ and $D_3$ analyzed into three colors and the picture signal $D_0$ representing the color used for forming the sharp signal $S_0$ and the unsharp signal $U_0$, and the selected signals $D_i$ and $D_0$ are then inputted into a look-up table 3. In the look-up table 3 are preliminarily tabled and stored values regarding the sharpness intensification coefficient $k(D_i, D_0)$ used by the function arithmetic unit 4 with respect to the combination of a plurality of the picture signals $D_i$ and $D_0$, such that the values of the coefficient $k(D_i, D_0)$ corresponding to the inputted picture signals $D_i$ and $D_0$ are outputted on a real time basis. The thus outputted coefficient $k(D_i, D_0)$ is inputted into a multiplier 5 together with the difference $(S_0 - U_0)$ obtained by the subtracter 1.

A signal $k(D_i, D_0) \cdot (S_0 - U_0)$ from the multiplier 5 is than inputted into an adder 6 where it is added to the picture signal $D_i$ outputted from the data selector 2 as so to thereby obtain the picture signal $D_i'$, the sharpness intensification of which has been done.

Although above description is given in respect of the case of color signals, it can naturally be applied to black/white signals.

It should be understood that many modifications and adaptations of the invention will become apparent to those skilled in the art and it is intended to encompass such obvious modifications and changes in the scope of the claims appended hereto.

What is claimed is:

1. A method for enhancing the sharpness of a color image, comprising the steps of:
   generating three color separation signals Di (i=1, 2, 3) from a color image, wherein each of the color separation signals represents a different color component of the color image;
   selecting one of the color separation signals to be a sharp signal So;

generating an unsharp signal Uo from the color image, wherein the unsharp signal represents the same color component of the color image as the color separation signal selected to be the sharp signal;

subtracting the unsharp signal from the sharp signal to form a difference signal So-Uo;

multiplying the difference signal by three multiplier coefficients k which are functions of the form k(Di, Do) to form three sharpness-enhancement signals k(Di, Do)·(So-Uo), wherein Di is a corresponding one of the three color separation signals and Do is the color separation signal selected to be the sharp signal; and adding the sharpness-enhancement signals to the corresponding color separation signals to obtain shaprness-enhanced color separation signals representing a sharpness-enhanced color image.

2. A method for enhancing the sharpness of a color image as claimed in claim 1, wherein the function k(Di,Do) is equal to f(Di)·Di/Do, wherein f(Di) is constant when Di is less than or equal to a minimum value Dmin and when Di is greater than or equal to a maximum value Dmax, and wherein f(Di) is a linear function of Di when Di is greater than the minimum value Dmin and less than the maximum value Dmax.

* * * * *